(12) United States Patent
Friedman et al.

(10) Patent No.: US 11,885,626 B2
(45) Date of Patent: Jan. 30, 2024

(54) SYSTEMS AND METHODS FOR UPDATING PICKUP AND DROPOFF LOCATIONS FOR A VEHICLE

(71) Applicant: Waymo LLC, Mountain View, CA (US)

(72) Inventors: Eric Friedman, Mountain View, CA (US); Saksiri Tanphaichitr, Mountain View, CA (US); Donghyun Kim, Mountain View, CA (US); Ben Wang, Mountain View, CA (US); Cameron Blume, Mountain View, CA (US); Mishika Vora, Mountain View, CA (US); Gaurav Agarwal, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 82 days.

(21) Appl. No.: 17/134,491

(22) Filed: Dec. 27, 2020

(65) Prior Publication Data

US 2022/0205794 A1 Jun. 30, 2022

(51) Int. Cl.
*G01C 21/34* (2006.01)
*B60W 60/00* (2020.01)
(Continued)

(52) U.S. Cl.
CPC ....... *G01C 21/3438* (2013.01); *B60W 60/001* (2020.02); *G01C 21/3605* (2013.01); *G01C 21/3804* (2020.08); *G06V 20/56* (2022.01)

(58) Field of Classification Search
CPC ............ G01C 21/3438; G01C 21/3804; G01C 21/3807; G01C 21/3811; G01C 21/3815; G01C 21/3833; G01C 21/3856; G01C 21/3885; G01C 21/3889; G01C 21/3893; G01C 21/3896; G01C 21/3605; B60W 60/001; G06V 20/56

See application file for complete search history.

(56) References Cited

U.S. PATENT DOCUMENTS 9,569,745 B1 * 2/2017 Ananthanarayanan ...................... G01C 21/343
10,545,023 B1 * 1/2020 Herbach .......... G08G 1/096833
(Continued)

*Primary Examiner* — Anne Marie Antonucci
*Assistant Examiner* — Patrick M Brady
(74) *Attorney, Agent, or Firm* — McDonnell Boehnen Hulbert & Berghoff LLP

(57) ABSTRACT

An example method includes setting an initial pickup location. The method includes causing an autonomous vehicle to navigate towards the initial pickup location. The method includes periodically generating a plurality of candidate updated pickup locations. The method includes selecting a suggested pickup location from the plurality of candidate pickup locations that achieves a benchmark for reducing one or more of a time and a distance associated with the initial pickup location for one or more of the autonomous vehicle and the client device. The method includes determining that the suggested pickup location satisfies a set of pre-update checks for limiting a number of pickup location updates. The method includes responsive to (i) selecting the suggested pickup location, and (ii) determining that the suggested pickup location satisfies the set of pre-update checks, causing the autonomous vehicle to navigate to the suggested pickup location.

19 Claims, 12 Drawing Sheets

(51) Int. Cl.
*G01C 21/00* (2006.01)
*G01C 21/36* (2006.01)
*G06V 20/56* (2022.01)

(56) References Cited

U.S. PATENT DOCUMENTS

| | | | |
|---|---|---|---|
| 2015/0339928 A1* | 11/2015 | Ramanujam | G08G 1/202 |
| | | | 701/23 |
| 2019/0063935 A1* | 2/2019 | Badalamenti | G06T 11/60 |
| 2019/0137290 A1* | 5/2019 | Levy | G05D 1/0276 |
| 2019/0163204 A1* | 5/2019 | Bai | G05D 1/0278 |
| 2019/0353495 A1* | 11/2019 | Dyer | G06Q 10/0639 |
| 2021/0080269 A1* | 3/2021 | Sharma | G06Q 50/30 |

* cited by examiner

SYSTEMS AND METHODS FOR UPDATING PICKUP AND DROPOFF LOCATIONS FOR A VEHICLE

BACKGROUND

Vehicles are used to complete various types of tasks, including object and people transportation. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than a traditional human driver. Autonomous operation of a vehicle can involve systems sensing the vehicle's surrounding environment to enable a computing system to plan and safely navigate.

SUMMARY

Example embodiments describe techniques for updating pickup and dropoff locations for a vehicle.

In one aspect, an example method is provided. The method includes setting, by a computing device based on a request from a client device, an initial pickup location. The method includes causing, by the computing device, an autonomous vehicle to navigate towards the initial pickup location. The method includes, while the autonomous vehicle navigates towards the initial pickup location, periodically generating, by the computing device, a plurality of candidate updated pickup locations. Each candidate updated pickup location corresponds to a different operational context associated with the initial pickup location. The method includes selecting, by the computing device, a suggested pickup location from the plurality of candidate pickup locations that achieves a benchmark for reducing one or more of a time and a distance associated with the initial pickup location for one or more of the autonomous vehicle and the client device. The method includes determining that the suggested pickup location satisfies a set of pre-update checks for limiting a number of pickup location updates while the autonomous vehicle navigates towards the initial pickup location. The method includes responsive to (i) selecting the suggested pickup location that achieves the benchmark, and (ii) determining that the suggested pickup location satisfies the set of pre-update checks, causing, by the computing device, the autonomous vehicle to navigate to the suggested pickup location.

In another aspect, an example system is provided. The system includes a computing device. The computing device includes one or more processors and a non-transitory computer readable medium having instructions stored thereon that when executed by the one or more processors cause the computing device to perform a set of functions. The set of functions includes setting, based on a request from a client device, an initial pickup location. The set of functions includes causing an autonomous vehicle to navigate towards the initial pickup location. The set of functions includes, while the autonomous vehicle navigates towards the initial pickup location, periodically generating a plurality of candidate updated pickup locations. Each candidate updated pickup location corresponds to a different operational context associated with the initial pickup location. The set of functions includes, selecting a suggested pickup location from the plurality of candidate pickup locations that achieves a benchmark for reducing one or more of a time and a distance associated with the initial pickup location for one or more of the autonomous vehicle and the client device. The set of functions includes determining that the suggested pickup location satisfies a set of pre-update checks for limiting a number of pickup location updates while the autonomous vehicle navigates towards the initial pickup location. The set of functions includes, responsive to (i) selecting the suggested pickup location that achieves the benchmark, and (ii) determining that the suggested pickup location satisfies the set of pre-update checks the autonomous vehicle to navigate to the suggested pickup location.

In yet another example, an example non-transitory computer readable medium having instructions stored thereon, that when executed by one or more processors cause a computing device to perform a set of functions. The set of functions includes setting, based on a request from a client device, an initial pickup location. The set of functions includes causing an autonomous vehicle to navigate towards the initial pickup location. The set of functions includes, while the autonomous vehicle navigates towards the initial pickup location, periodically generating a plurality of candidate updated pickup locations. Each candidate updated pickup location corresponds to a different operational context associated with the initial pickup location. The set of functions includes, selecting a suggested pickup location from the plurality of candidate pickup locations that achieves a benchmark for reducing one or more of a time and a distance associated with the initial pickup location for one or more of the autonomous vehicle and the client device. The set of functions includes determining that the suggested pickup location satisfies a set of pre-update checks for limiting a number of pickup location updates while the autonomous vehicle navigates towards the initial pickup location. The set of functions includes, responsive to (i) selecting the suggested pickup location that achieves the benchmark, and (ii) determining that the suggested pickup location satisfies the set of pre-update checks the autonomous vehicle to navigate to the suggested pickup location.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
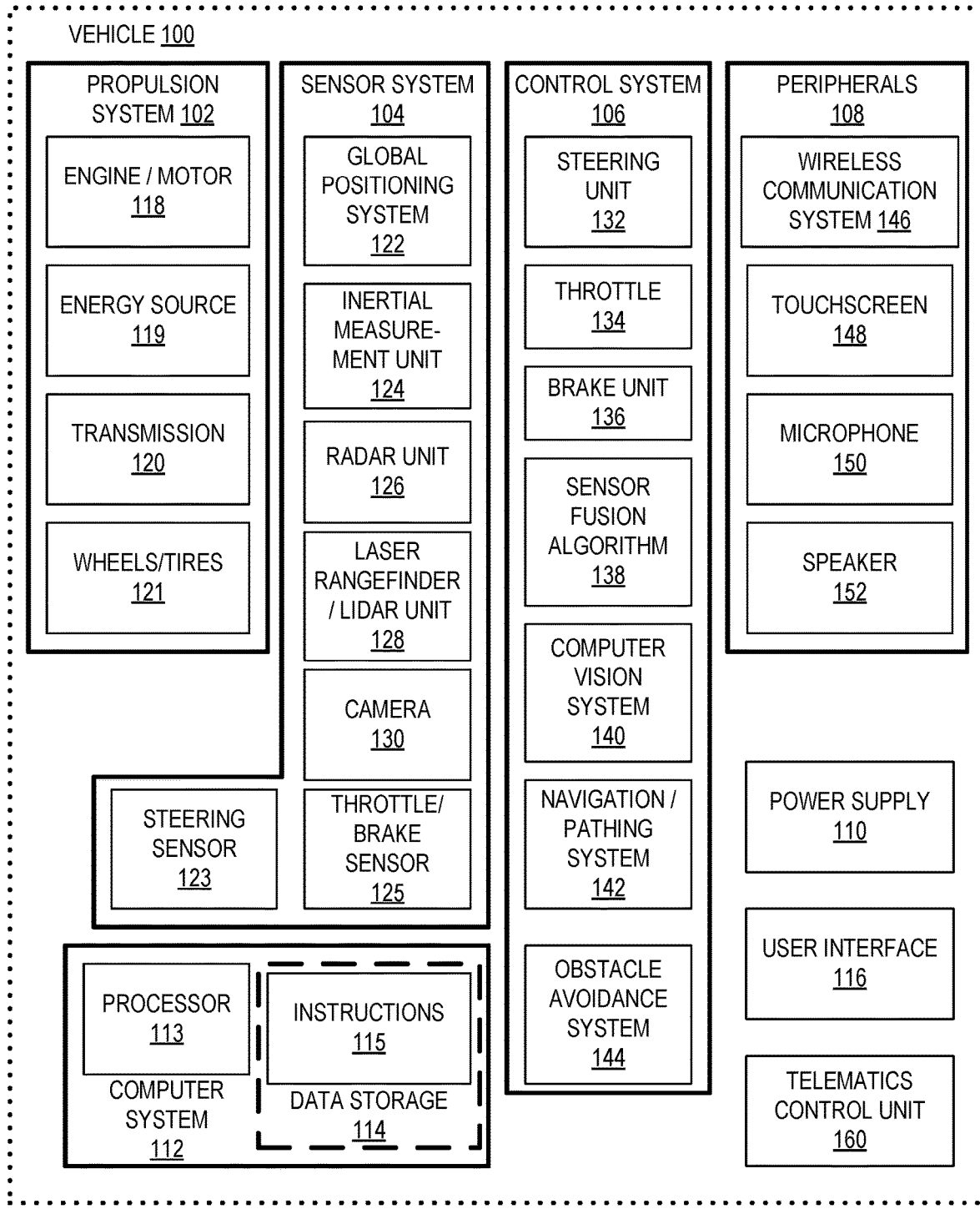
FIG. 1 is a functional block diagram illustrating a vehicle, according to example implementations.
Figure 2A:
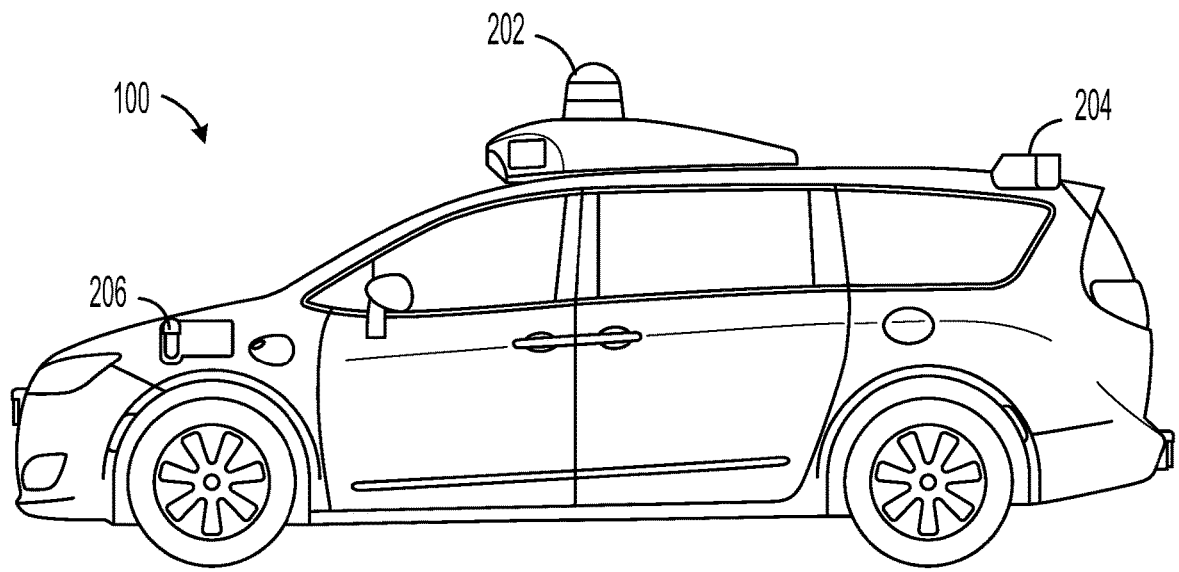
FIG. 2A illustrates a side view of a vehicle, according to one or more example embodiments.
Figure 2B:
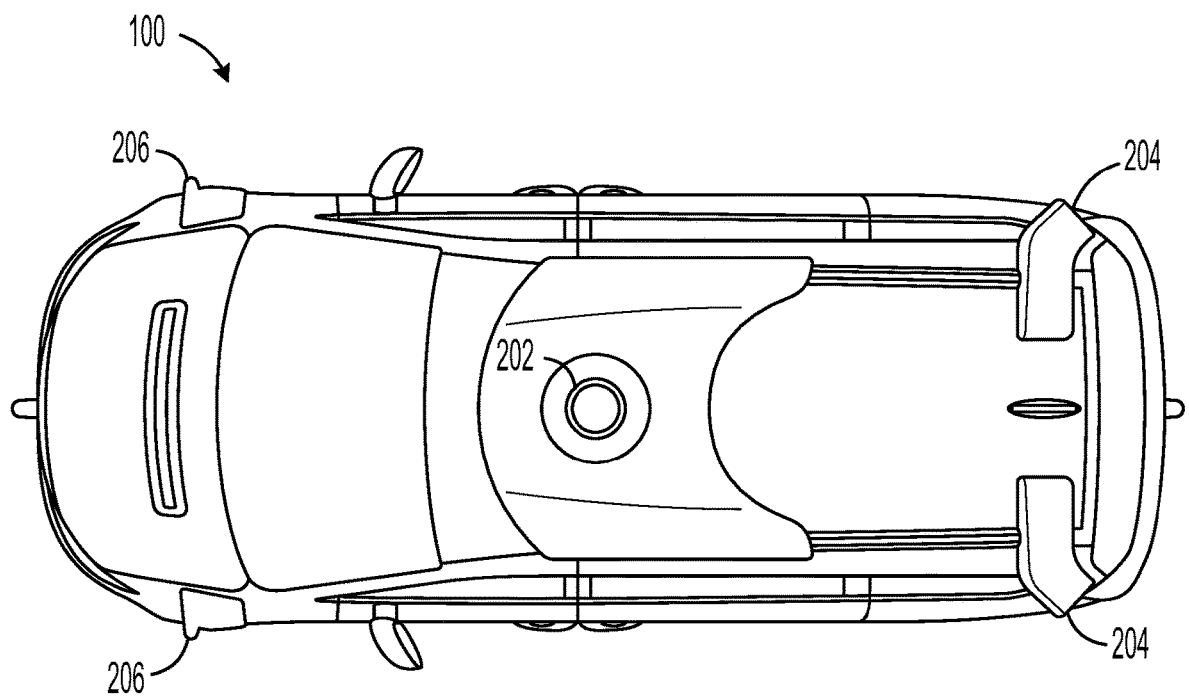
FIG. 2B illustrates a top view of a vehicle, according to one or more example embodiments.
Figure 2C:
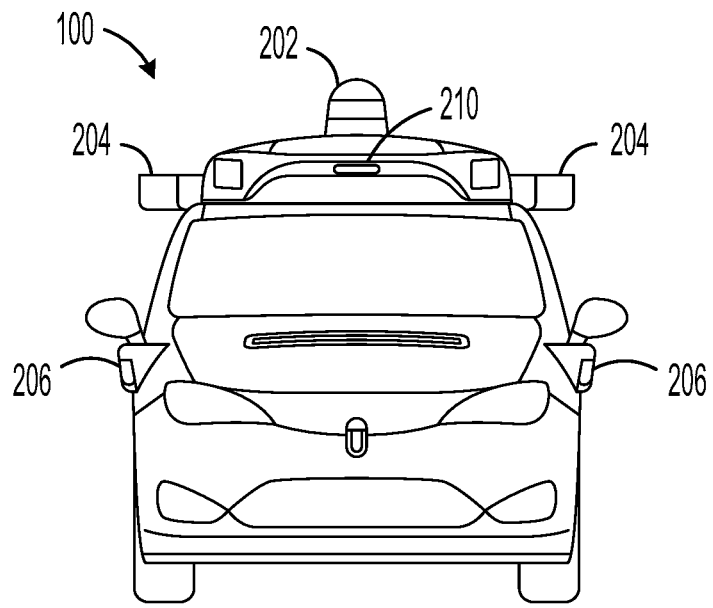
FIG. 2C illustrates a front view of a vehicle, according to one or more example embodiments.
Figure 2D:
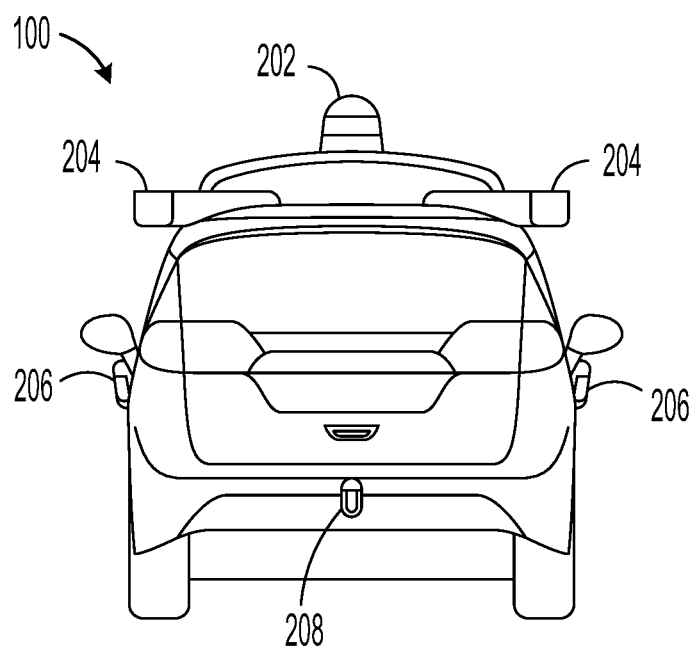
FIG. 2D illustrates a back view of a vehicle, according to one or more example embodiments.
Figure 2E:
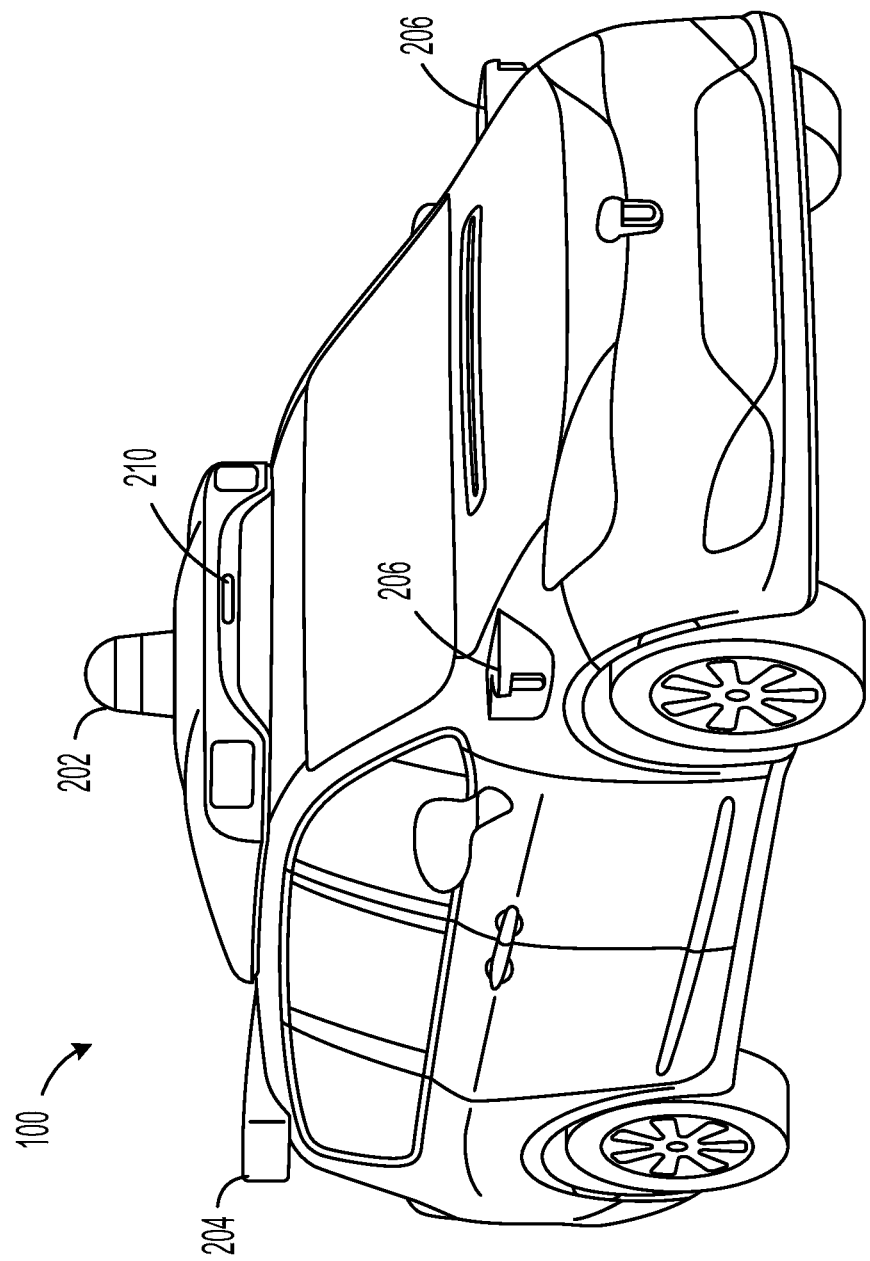
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Advancements in computing, sensors, and other technologies have enabled vehicles to safely navigate autonomously between locations without requiring input from a driver. By processing measurements of the surrounding environment from vehicle sensors in near real-time, an autonomous vehicle can transport passengers or objects between locations while avoiding obstacles, obeying traffic requirements, and performing other necessary actions that are typically conducted by a driver. The shift of control of the vehicle over to a vehicle control system can permit passengers to devote their attention to tasks other than driving.

The rise of autonomous-capable vehicles may contribute to an increase in usage of vehicle-sharing. Vehicle-sharing can often involve a fleet of vehicles that are centrally-managed by an overall system that is configured to receive requests from potential passengers and dispatch nearby vehicles to locate, pick up, and provide rides to passengers in exchange for a fee. Within the fleet, each vehicle may fulfill requests for rides from passengers. For instance, a passenger may use a smartphone application or another computing device to submit a request to the system managing the fleet of vehicles. A request from a potential passenger may include information to assist the system complete the request, such as a current location of the passenger, a quantity of passengers that plan on receiving transportation, and one or more desired destinations for the vehicle to drop off passengers. In response to receiving the request, the system may identify and dispatch a vehicle within the fleet that can quickly travel to the passenger's current location and autonomously transport the passenger or passengers to one or more desired destinations accordingly. After completing a ride request, the vehicle may subsequently be dispatched to provide transportation for other passengers.

Whether operating as part of a vehicle-sharing fleet or independently, a vehicle capable of autonomous or semi-autonomous operation may encounter scenarios in which pickup or dropoff of a passenger presents difficulties. For example, the vehicle may be re-routed due to changing traffic conditions, may reach a pickup location that is not suitable for pulling over to pick up a passenger, or may arrive before the passenger and be prompted to move past the pickup location. Similar scenarios may occur after pickup of a passenger at a dropoff location. In these contexts it may be desirable to move the pickup or dropoff location automatically.

Additionally, some contexts for pickup and dropoff may affect passenger convenience. For example, altered pickup and dropoff locations may require the passenger to walk a further distance, or to cross a road lacking cross-walks. Further, changing the pickup or dropoff location several times in rapid succession may require the passenger to change course or change plans several times, which may reduce user satisfaction even if the adjustments save time.

These aspects of passenger pickup and dropoff may be addressed by a manual user of a vehicle based on intuition or human judgement. However, for autonomous or semi-autonomous vehicles, a systematic approach for pickup and dropoff optimization can be used to improve pickup and dropoff times while also maximizing passenger satisfaction.

Within examples, these issues in pickup and dropoff of passengers using an autonomous or semi-autonomous vehicle can be resolved by determining optimized pickup and/or dropoff locations, and vetting candidate pickup and dropoff locations before suggesting them for the vehicle. This allows an autonomous vehicle to select an updated pickup or dropoff location when an undesired context arises without waiting for further control instructions from a controller.

In some examples, high-level navigation decisions are established by a central controller of a fleet of vehicles, which instructs individual vehicles to pick up or drop off passengers associated with particular client devices (e.g., devices using a software application that communicates with the central controller). There may be latency between communications between the central controller and the vehicle, meaning that the vehicle may benefit from added context in pickup and dropoff instructions. For example, the central controller may send a ranked list of suggested pickup and/or dropoff locations that may be suitable in different contexts (e.g., a missed turn versus a traffic prompt to "move along" after reaching an initial pickup location). This may allow the vehicle to use the suggested pickup and/or dropoff locations without an affirmative instruction from the central controller. In this manner, a central controller and an autonomous or semi-autonomous vehicle can coordinate to handle changing driving contexts in a robust and adaptive manner.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
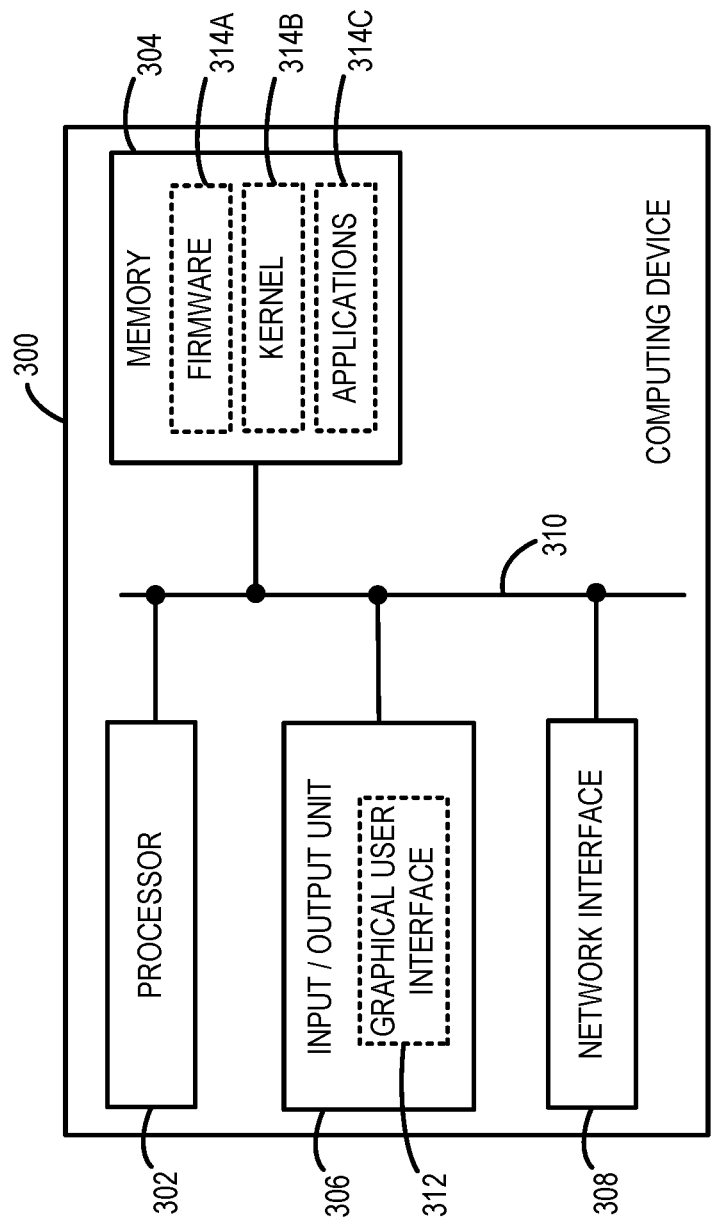
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide interface 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
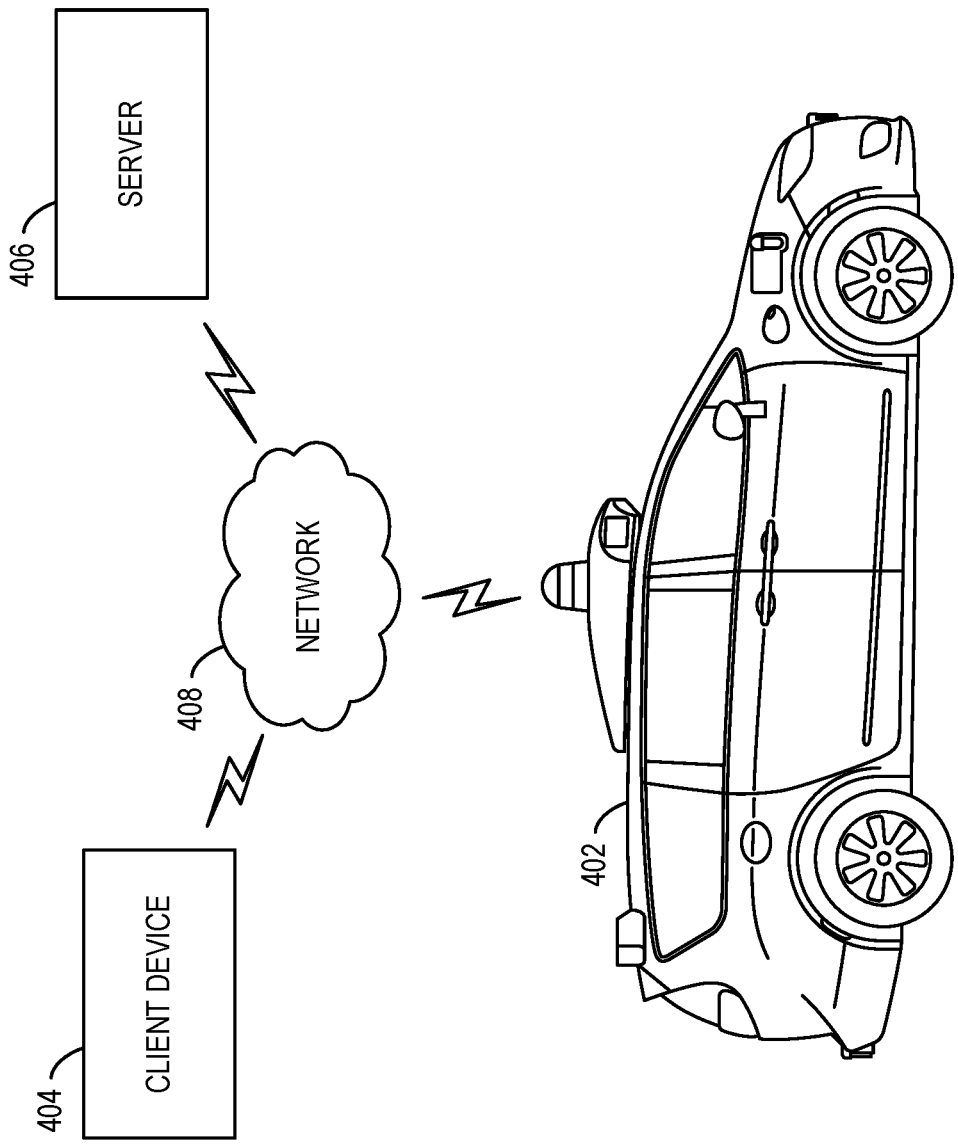
FIG. 4 is a system for wireless communication between computing devices and a vehicle, according to one or more example embodiments.

FIG. 4 is a system for wireless communication between computing devices and a vehicle, according to one or more example embodiments. Particularly, system 400 is shown with vehicle 402, client device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode, vehicle 402 may navigate with or without passengers enabling vehicle 402 to pick up and drop off passengers (or cargo) between desired destinations. In some embodiments, vehicle 402 can operate as part of a fleet configured to communicate with a remote operator that may use a remote computing device.

Client device 404 may represent any type of device used for requesting pickup and/or dropoff by vehicle 402, including but not limited to those described herein. Within examples, client device 404 may represent any type of device configured to (i) receive information related to vehicle 402, such as a location, expected time of arrival, and/or route of vehicle 402, (ii) provide an interface (e.g., a GUI, physical input interfaces) through which a user (e.g., a passenger) can in turn perceive the information and input a response related to the information, and (iii) transmit the response to vehicle 402 or to other devices (e.g., storage at server 406). As such, client device 404 may take various forms, such as a personal computer, a tablet, a mobile phone (e.g., a smart phone), a wearable device (e.g., a smart watch) and/or another type of computing device.

The position of client device 404 relative to vehicle 402 can vary within examples. For instance, client device 404 may have a remote position from vehicle 402, such as operating inside a physical building. In another example, client device 404 may correspond to a computing device within vehicle 402 that is physically separate from vehicle 402, but with which a human operator can interact while as a passenger or driver of vehicle 402. In some examples, client device 404 may be a computing device with a touchscreen operable by the passenger of vehicle 402.

Operations described herein can be performed by any of the components communicating via network 408. Particularly, client device 404 may request pickup or dropoff services provided by vehicle 402. Server 406 may determine potential options for client device 404 to display. Potential options could include routes, vehicle movements, pickup and dropoff location, and other navigation parameters for review by client device 404 and/or a remote operator using client device 404. While vehicle 402 may operate in autonomous or semi-autonomous modes, server 406 can be configured to control aspects of navigating vehicle 402, such as by updating pickup and dropoff locations, or suggesting potential updates to vehicle 402.

Server 406 may be configured to wirelessly communicate with client device 404 and vehicle 402 via network 408 (or perhaps directly with client device 404 and/or vehicle 402). As such, server 406 may represent any computing device configured to receive, store, determine, and/or send information relating to vehicle 402 and the remote control. As such, server 406 may be configured to perform any operation(s), or portions of such operation(s), that is/are described herein as performed by client device 404 and/or vehicle 402. Some implementations of wireless communication related to remote assistance may utilize server 406, while others may not.

Network 408 represents infrastructure that can enable wireless communication between computing devices, such as vehicle, 402, client device 404, and server 406. For example, network 408 can correspond to a wireless communication network, such as the Internet or a cellular wireless communication network. The various systems described above may perform various operations. These operations and related features will now be described.

Reference is now made to FIGS. 5-8, which illustrate example scenarios for updating a pickup location. Similar operations can be applied in the context of a dropoff location for the autonomous vehicle.

Figure 5:
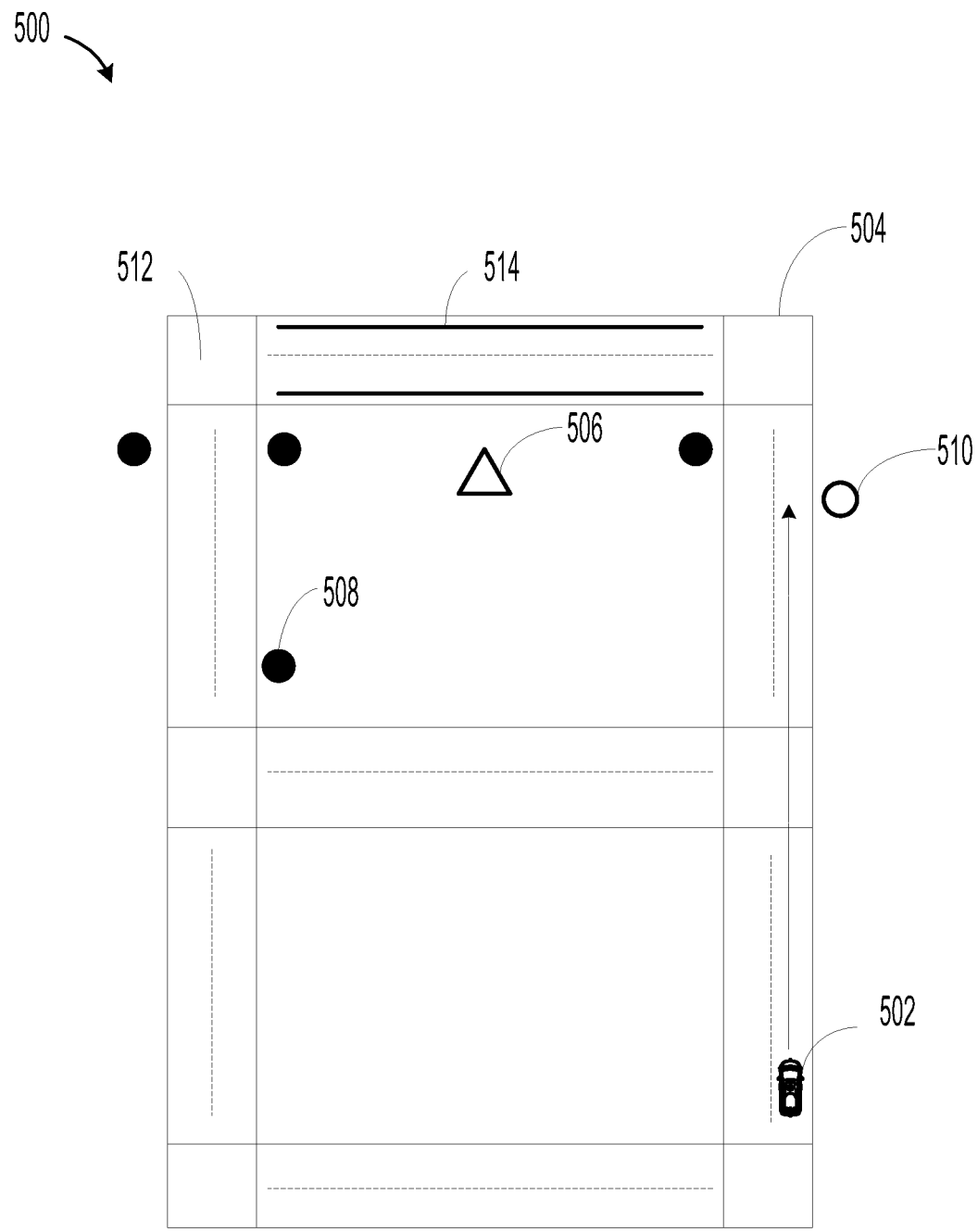
FIG. 5 illustrates a pre-assignment context for suggesting an initial pickup location for an autonomous vehicle, according to one or more example embodiments.

FIG. 5 illustrates a pre-assignment context for suggesting an initial pickup location for an autonomous vehicle, according to one or more example embodiments. In particular, FIG. 5 shows an environment 500 in which a vehicle 502 navigates. In the pre-assignment context, vehicle 502 navigates on a roadway 504 without a passenger. A computing device (e.g., server 406) determines that a client device 506 associated with a registered passenger is proximate to (e.g., within a predefined distance of) vehicle 502, and automatically generates candidate initial pickup locations 508. Based on a walking cost for the passenger and an estimated time of arrival associated with each candidate initial pickup location, the computing device selects a suggested initial pickup location 510. For example, the computing device may take observed traffic conditions (e.g., from a traffic database provider), intersections 512, and no-pullover zones 514 into account when generating candidate initial pickup locations 508 and determining the estimated time of arrival. The computing device may also weigh other factors, such as a likelihood of finding a suitable pullover location, or a likelihood of avoiding obstructing traffic when selecting suggested initial pickup location 510. For example, this may be based on historical data from past trips, based on observed traffic data, based on data received from vehicle 502 and/or other autonomous vehicles in environment 500, and/or based on simulated pickups based on historic onboard logs and sensor data.

In the pre-assignment context, vehicle 502 navigates on roadway 504 towards suggested initial pickup location 510 in after receiving a request for pickup from client device 506. By vetting each candidate initial pickup location and navigating towards suggested initial pickup location 510 rather than other candidate initial pickup locations, the computing device and vehicle 502 can conveniently be positioned for picking up passengers before assigning the request to vehicle 502. In examples where a plurality of vehicles are proximate to the passenger, a set of candidate pickup locations can be generated for each vehicle, and a vehicle can be assigned to the request based on having the highest ranked candidate pickup location. Within examples, the total time to dropoff, including estimated time to arrival at the pickup location and subsequent time to arrival at the dropoff location can be used for generating candidate pickup locations and selecting a suggested initial pickup location. This allows for an initial pickup location that saves time overall, even if other pickup locations allow for quicker pickup.

Figure 6:
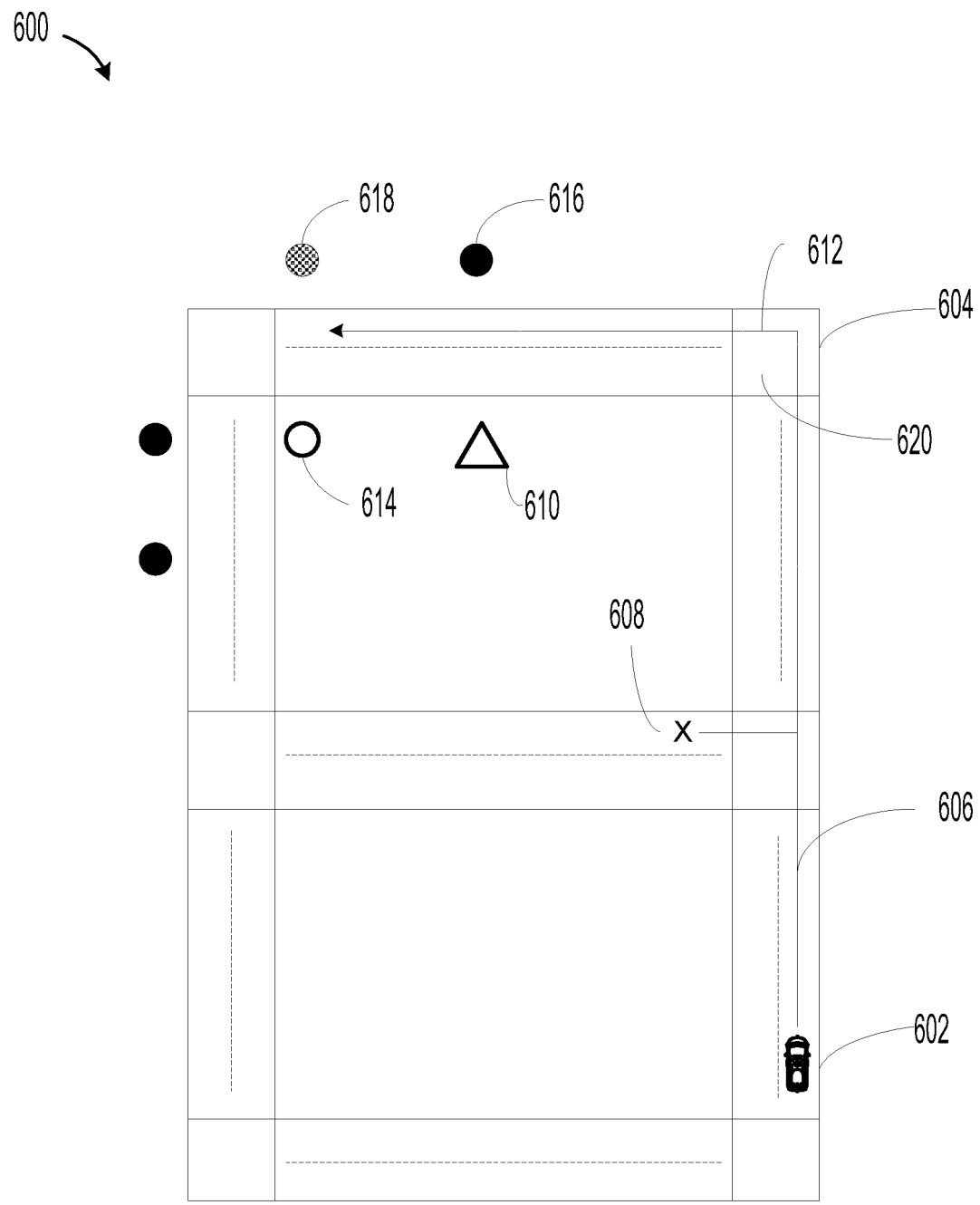
FIG. 6 illustrates a missed turn context for suggesting an updated pickup location for an autonomous vehicle, according to one or more example embodiments.

FIG. 6 illustrates a missed turn context for suggesting an updated pickup location for an autonomous vehicle, according to one or more example embodiments. In particular, FIG. 6 shows an environment 600 in which a vehicle 602 navigates. In the missed turn context, vehicle 602 navigates on a roadway 604 towards an initial pickup location 614 along an initial route 606. However, due to an obstruction, traffic condition, sensor error, navigation error, or another type of error, vehicle 602 misses turn 608. A computing device may periodically determine one or more candidate updated pickup locations 616 in order to generate an alternative route to pick up a passenger associated with a client device 610. The computing device (e.g., server 406) generates each candidate updated pickup location based at least on a walking cost for the passenger and an estimated time of arrival associated with each candidate initial pickup location, and selects a suggested pickup location 618. The computing device may also take roadway and traffic conditions into account, such as intersections, no-pullover zones, a level of traffic, or other conditions when generating one or more candidate updated pickup locations 616 and determining the estimated time of arrival. The computing device may also weigh other factors, such as a likelihood of finding a suitable pullover location, or a likelihood of avoiding obstructing traffic when selecting suggested pickup location 618. For example, this may be based on historical data from past trips, based on observed traffic data, based on data received from vehicle 602 and/or other autonomous vehicles in environment 600, and/or based on simulated pickups based on historic onboard logs and sensor data.

As noted above, the computing device may periodically generate candidate updated pickup locations and suggest updated pickup locations without receiving prompts from vehicle 602. In this manner, vehicle 602 can receive the candidates and suggestions prior to missing turn 608, and react more quickly to proceed along updated route 612 without further instructions from the computing device. This pre-emptive approach to suggesting alternative pickup spots can prevent unnecessary delays in adjusting a route. For example, vehicle 602 can receive a ranked list of candidate updated pickup locations 616, and may select suggested pickup location 618 from the list after the missed turn 608, without further prompting from the computing device. Avoiding this additional prompting from the computing device allows vehicle 602 to turn at intersection 620, thereby avoiding another updated pickup location and/or unnecessary re-routing.

Within examples, the computing device may use prompts from vehicle 702 in addition to periodically generating candidate updated pickup locations. For example, vehicle 702 may detect a missed turn, a blocked pullover location, a road obstruction, a traffic delay, or another context for optimizing pickup, and may interrupt the periodic generation by the computing device. In this manner, the computing device can continually provide candidate updated pickup locations that cover several different operational contexts of vehicle 702, and provide targeted updates based on context-specific feedback provided by vehicle 702. This may allow for more robust and adaptive pickup location suggestions by the computing device.

Figure 7:
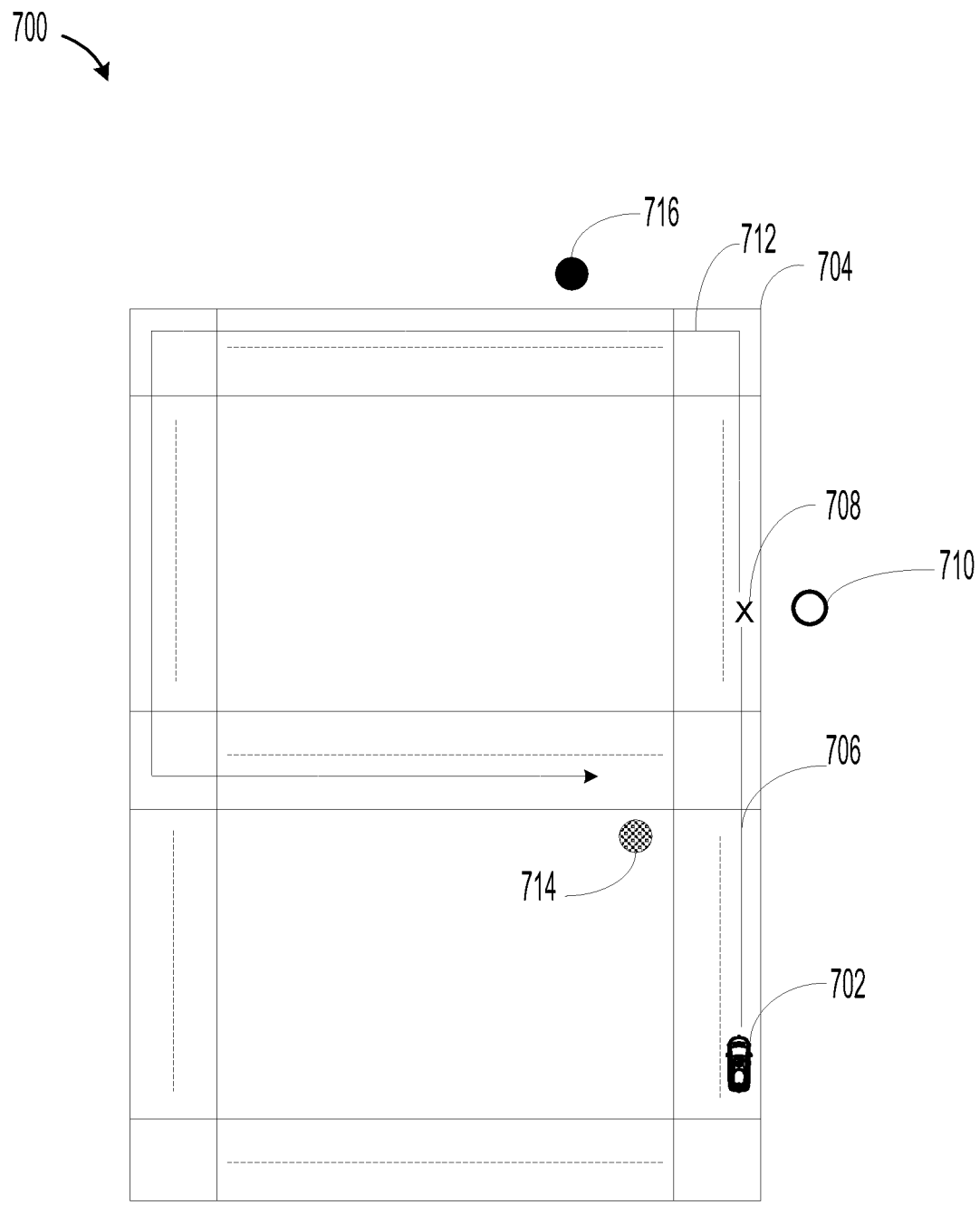
FIG. 7 illustrates a no pullover context for suggesting an updated pickup location for an autonomous vehicle, according to one or more example embodiments.

FIG. 7 illustrates a no pullover context for suggesting an updated pickup location for an autonomous vehicle, according to one or more example embodiments. In particular, FIG. 7 shows an environment 700 in which a vehicle 702 navigates. In the no pullover context, vehicle 702 navigates on a roadway 704 towards an initial pickup location 710 along an initial route 706. However, due to an obstruction or a traffic condition, vehicle 702 is unable to pullover at a pullover location 708 to pick up a passenger. As described above, a computing device may periodically determine a plurality of candidate updated pickup locations in order to generate an alternative route to pick up a passenger associated with a client device. The computing device (e.g., server 406) generates each candidate updated pickup location based at least on a walking cost for the passenger and an estimated time of arrival associated with each candidate initial pickup location, and selects a suggested pickup location 714.

As noted above, the computing device may take a walking cost for a passenger into account when determining candidate updated pickup locations and selecting suggested pickup location 714. In the present example, vehicle 702 has determined that it is unable to pullover at pullover location 708, so suggested pickup location 714 is selected based on a relatively low walking cost to suggested pickup location 714, even though another candidate adjusted pickup location 716 has an estimated time of arrival that is sooner than the estimated time of arrival associated with suggested pickup location 714. An impact on estimated time to arrival at the dropoff location can also be used for selecting suggested pickup location 714. For example, the estimated time to arrival to each candidate adjusted pickup location, walking score associated with each candidate adjusted pickup location, and estimated time to arrival at the dropoff location resulting from each candidate adjusted pickup location can be weighted (e.g., using a cost function) to select suggested pickup location 714. In this manner, the computing device can identify suggested pickup location 714 such that a passenger waits slightly longer for pickup (e.g., by two minutes) or walks slightly further to pickup (e.g., one extra block), but optimizes the route such that dropoff is quicker (e.g., by five minutes).

As described above with respect to FIG. 6, the computing device may periodically generate candidate updated pickup locations and suggest updated pickup locations without receiving prompts from vehicle 702. In this manner, vehicle 702 can receive the candidates and suggestions prior to determining that it cannot pull over, and react more quickly to proceed along updated route 712 without further instructions from the computing device.

Figure 8:
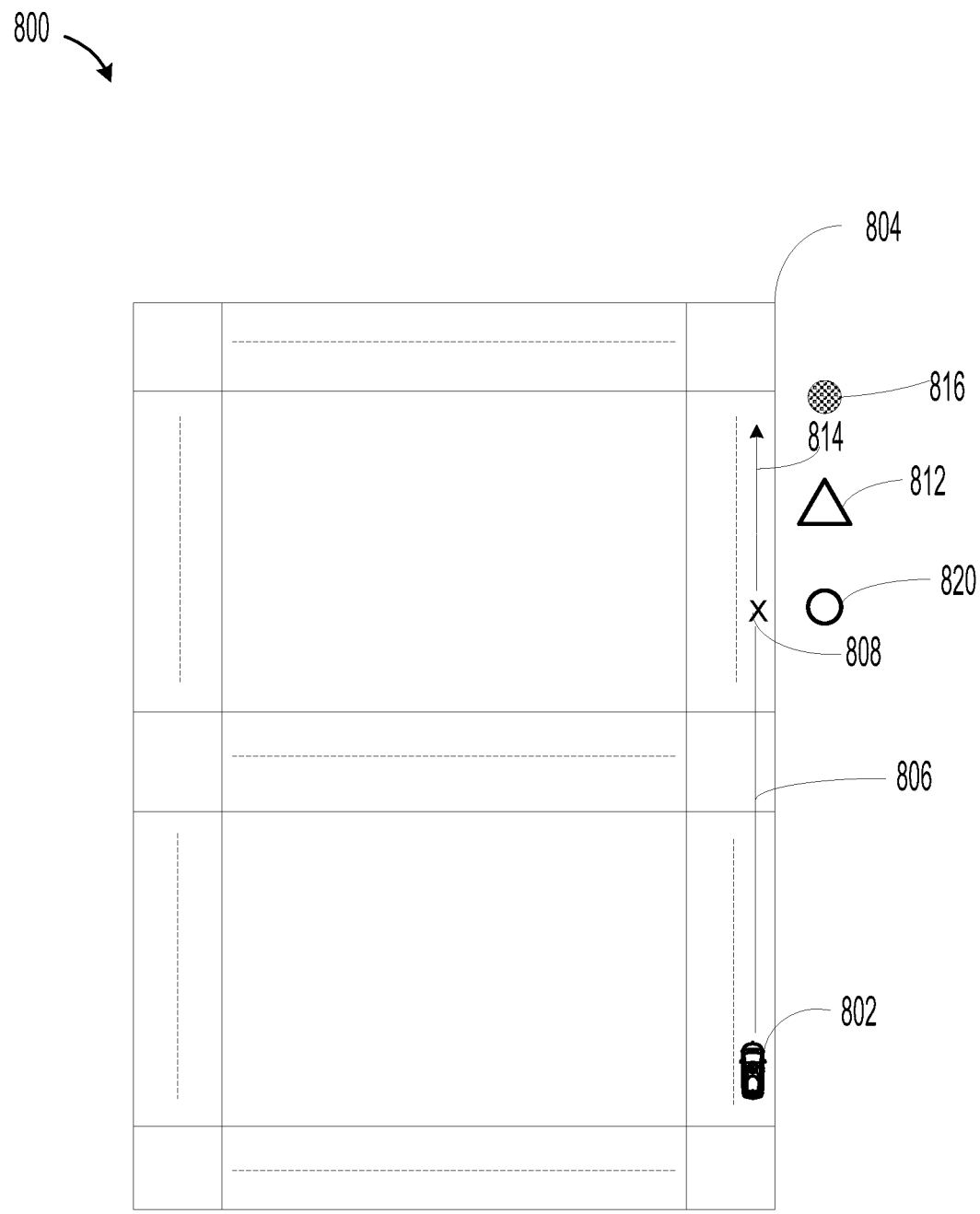
FIG. 8 illustrates a move along context for suggesting an updated pickup location for an autonomous vehicle, according to one or more example embodiments.

FIG. 8 illustrates a move along context for suggesting an updated pickup location for an autonomous vehicle, according to one or more example embodiments. In particular, FIG. 8 shows an environment 800 in which a vehicle 802 navigates. In the move along context, vehicle 802 navigates on a roadway 804 towards an initial pickup location 820 along an initial route 806. However, due to a delay in arrival of a passenger associated with a client device 812, vehicle 802 impedes traffic and is prompted to move (e.g., based on proximity sensor data indicated stationary vehicles waiting behind vehicle 802, or audio sensor data indicating a vehicle horn) from a stop location 808. As described above, a computing device may periodically determine a plurality of candidate updated pickup locations in order to generate an alternative route to pick up a passenger associated with a client device. The computing device (e.g., server 406) generates each candidate updated pickup location based at least on a walking cost for the passenger and an estimated time of arrival associated with each candidate initial pickup location, and selects a suggested pickup location 816.

As noted above, the computing device may take a walking cost for a passenger into account when determining candidate updated pickup locations and selecting suggested pickup location 816. In the present example, vehicle 802 has determined that it is unable to wait at stop location 808, so suggested pickup location 816 is selected based on a relatively low walking cost to suggested pickup location 816. In addition, suggested pickup location 816 has a relatively low estimated time of arrival.

As described above with respect to FIG. 8, the computing device may periodically generate candidate updated pickup locations and suggest updated pickup locations without receiving prompts from vehicle 802. In this manner, vehicle 802 can receive the candidates and suggestions prior to determining that it is being prompted to move off of route 806, and react more quickly to proceed along updated route 814 without further instructions from the computing device.

Though FIGS. 5-8 focus on pickup locations, similar operations can take place for dropoff locations. Further, though a few pickup contexts are described in FIGS. 5-8, other contexts may arise in which periodically sending suggested updated pickup locations to a vehicle can prove beneficial.

Figure 9:
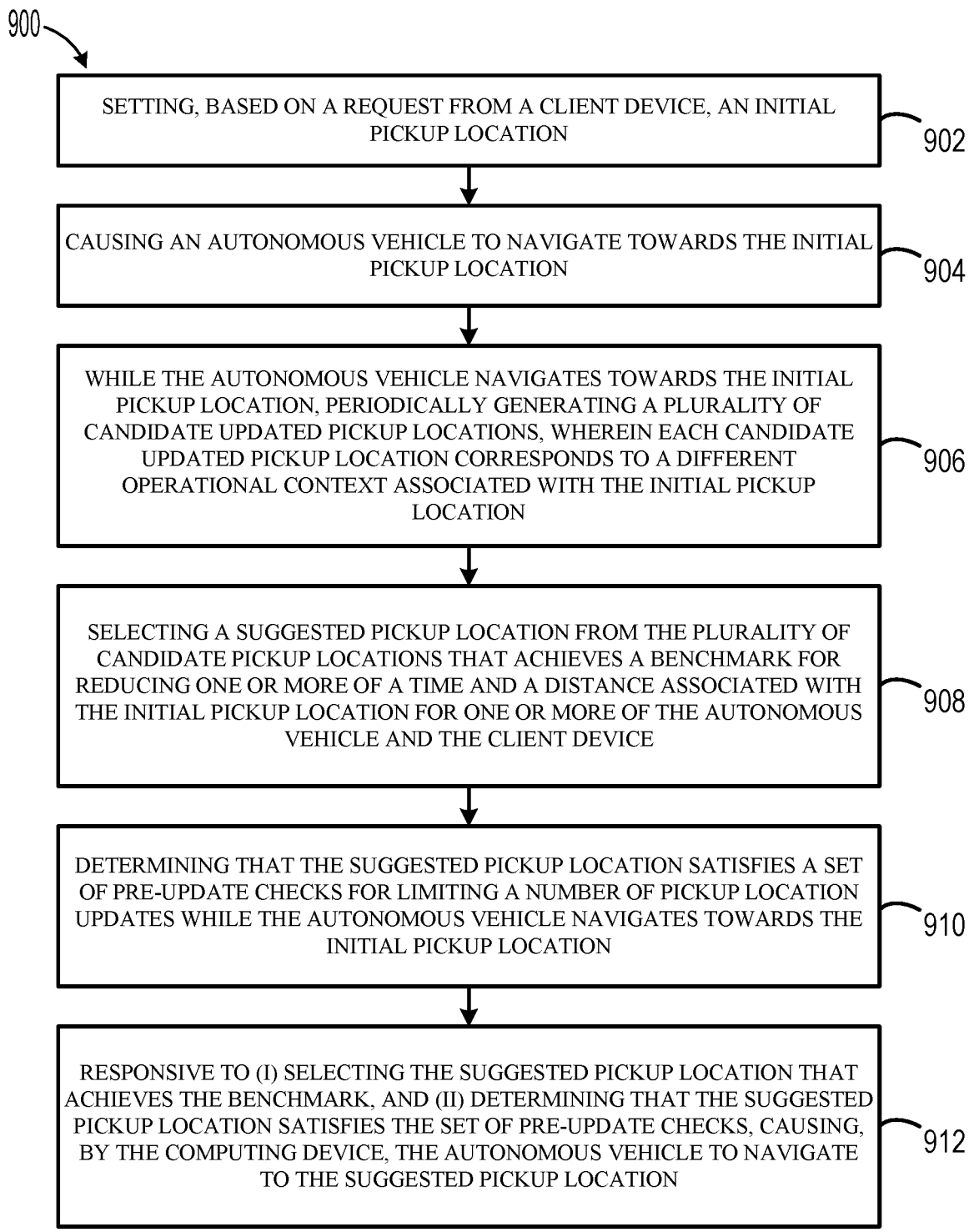
FIG. 9 is a flow chart of a method, according to example implementations.

FIG. 9 is a flow chart of a method 900, according to example implementations. Method 900 represents an example method that may include one or more operations, functions, or actions, as depicted by one or more of blocks 902-912, each of which may be carried out by any of the systems, devices, and/or vehicles shown in FIGS. 1-8, among other possible systems. For instance, system 400 depicted in FIG. 4 may enable execution of method 900.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 902, method 900 includes setting, based on a request from a client device, an initial pickup location.

At block 904, method 900 includes causing an autonomous vehicle to navigate towards the initial pickup location.

At block 906, method 900 includes, while the autonomous vehicle navigates towards the initial pickup location, periodically generating a plurality of candidate updated pickup locations, wherein each candidate updated pickup location corresponds to a different operational context associated with the initial pickup location.

At block 908, method 900 includes selecting a suggested pickup location from the plurality of candidate pickup locations that achieves a benchmark for reducing one or more of a time and a distance associated with the initial pickup location for one or more of the autonomous vehicle and the client device.

At block 910, method 900 includes determining that the suggested pickup location satisfies a set of pre-update checks for limiting a number of pickup location updates while the autonomous vehicle navigates towards the initial pickup location.

At block 912, method 900 includes, responsive to (i) selecting the suggested pickup location that achieves the benchmark, and (ii) determining that the suggested pickup location satisfies the set of pre-update checks, causing, by the computing device, the autonomous vehicle to navigate to the suggested pickup location.

Within examples, generating the plurality of candidate updated pickup locations includes using a set of operational contexts to determine candidate updates to a route to the initial pickup location, and generating the candidate updated pickup locations based on the candidate updates to the route. In these examples, the set of operational contexts may include one or more of a changed client device location, a missed turn on the route, a road blockage, a change in traffic conditions, a failed maneuver of the autonomous vehicle (e.g., a missed turn or failed pull over), and a traffic prompt to move the autonomous vehicle off the route or further along the route (e.g., a move along prompt).

Within examples, causing the autonomous vehicle navigate to the updated pickup location includes ranking the plurality of candidate updated pickup locations, sending the ranked plurality of candidate updated pickup locations to the autonomous vehicle, wherein the ranked plurality of candidate updated pickup locations include the updated pickup location, and authorizing the autonomous vehicle to select the from the ranked plurality of candidate updated pickup locations based on a local context of the autonomous vehicle. In these examples, the autonomous vehicle selects the updated pickup location from the ranked plurality of candidate updated pickup locations. In related examples, each of the ranked plurality of candidate updated pickup locations can correspond to a different operational context associated with the initial pickup location, and the autonomous vehicle can be configured to select one of the ranked plurality of candidate updated pickup locations based on an operational context detected by the autonomous vehicle.

In alternative or additional examples, each candidate updated pickup location can be provided with a score in addition to or instead of providing a ranking. As noted above, the score can be an output of a cost function, machine learning model, statistical model or another process for scoring candidate updated pickup locations. In this manner, the autonomous vehicle can vet each candidate more objectively. For example, if each candidate has a score below a threshold (e.g., below 80 out of 100), the autonomous vehicle can wait for further input rather than selecting the candidate with the best ranking, or may automatically determine an alternate updated pickup location. In some examples, a relative score and/or cost can be provided to indicate how much better one candidate is relative to other candidates.

Within examples, selecting the suggested pickup location from the plurality of candidate pickup locations includes ranking the plurality of candidate updated pickup locations, and selecting a highest-ranked candidate updated pickup location as the suggested pickup location. In these examples, ranking the plurality of candidate updated pickup locations can include ranking each candidate updated pickup location based on (i) an estimated time of arrival associated with the candidate updated pickup location, and (ii) a walking cost associated with the candidate updated pickup location. The walking cost corresponds to a walking distance between a location of the client device and the candidate updated pickup location. For example, ranking each candidate updated pickup location can be based on the estimated time of arrival and the walking cost comprises using a cost function to score each candidate updated pickup location based on the estimated time of arrival and the walking cost.

Within examples, the autonomous vehicle is a first autonomous vehicle, and method 900 further includes selecting a second autonomous vehicle to navigate to the updated pickup location based on an estimated time of arrival of the second autonomous vehicle to the updated pickup location, and reassigning the first autonomous vehicle to another initial pickup location.

Within examples, the set of pre-update checks for limiting a number of pickup location updates while the autonomous vehicle navigates towards the initial pickup location comprises one or more of: determining that the suggested pickup location provides a threshold level of improvement over the initial pickup location, wherein the threshold level of improvement corresponds to one or more of an estimated time to arrival associated with the suggested pickup location and a walking score associated with the suggested pickup location, determining that updating the initial pickup location corresponds to a number of pickup location updates that is less than a threshold number of pickup location updates, determining that updating the initial pickup location corresponds to a rate of pickup location updates that is less than a threshold rate of pickup location updates, determining that a threshold time has passed since selecting the suggested pickup location, and determining that the suggested pickup location is within a threshold radius of the initial pickup location.

Within examples, setting the initial pickup location includes generating a plurality of candidate initial pickup locations based on a location of the client device and a location of the autonomous vehicle. Setting the initial pickup location can further include, for each candidate initial pickup location: determining an estimated time of arrival associated with the candidate initial pickup location, and determining a walking cost associated with the candidate initial pickup location, wherein the walking cost corresponds to a walking distance between a location of the client device and the candidate initial pickup location. Setting the initial pickup location can further include selecting the initial pickup location from the plurality of candidate initial pickup locations based on a cost function of the estimated time of arrival and the walking cost for each candidate initial pickup location.

Within examples, method 900 further includes setting an initial dropoff location, causing the autonomous vehicle to navigate from the updated pickup location towards the initial dropoff location, while the autonomous vehicle navigates towards the initial dropoff location, periodically generating a plurality of candidate updated dropoff locations, wherein each candidate updated dropoff location corresponds to a different operational context associated with the initial pickup location, selecting a suggested dropoff location from the plurality of candidate dropoff location that achieves a benchmark for reducing one or more of a time and a distance associated with the initial dropoff location for the autonomous vehicle, determining that the suggested dropoff location satisfies a set of pre-update checks for limiting a number of dropoff location updates while the autonomous vehicle navigates towards the initial dropoff location, responsive to (i) selecting the suggested dropoff location that achieves the benchmark, and (ii) determining that the suggested dropoff location satisfies the set of pre-update checks, creating an updated dropoff location matching the suggested dropoff location, and causing the autonomous vehicle to navigate to the updated dropoff location.

Within examples, generating the plurality of candidate updated pickup locations comprises generating a plurality of pickup/dropoff pairs. In these examples, selecting the suggested pickup location may be based at least in part on a combined score (e.g, a cost function score) for each pickup/dropoff pair. Aftering pickup, selecting a suggested dropoff location may be based only on a score for each candidate updated dropoff location.

In related examples for suggesting a dropoff location, the set of pre-update checks include one or more of: determining that the suggested dropoff location provides a threshold level of improvement over the initial dropoff location, wherein the threshold level of improvement corresponds to one or more of an estimated time to arrival associated with the suggested dropoff location and a walking score associated with the dropoff pickup location (e.g., based on a weighted score of the estimated time of arrival and walking score exceeding a threshold score), determining that updating the initial pickup location corresponds to a number of pickup location and dropoff location updates that is less than a threshold number of pickup location and dropoff location updates, determining that updating the initial dropoff location corresponds to a rate of dropoff location updates that is less than a threshold rate of dropoff location updates, determining that a threshold time has passed since selecting the suggested dropoff location, and determining that the suggested dropoff location is within a threshold radius of the initial dropoff location.

Figure 10:
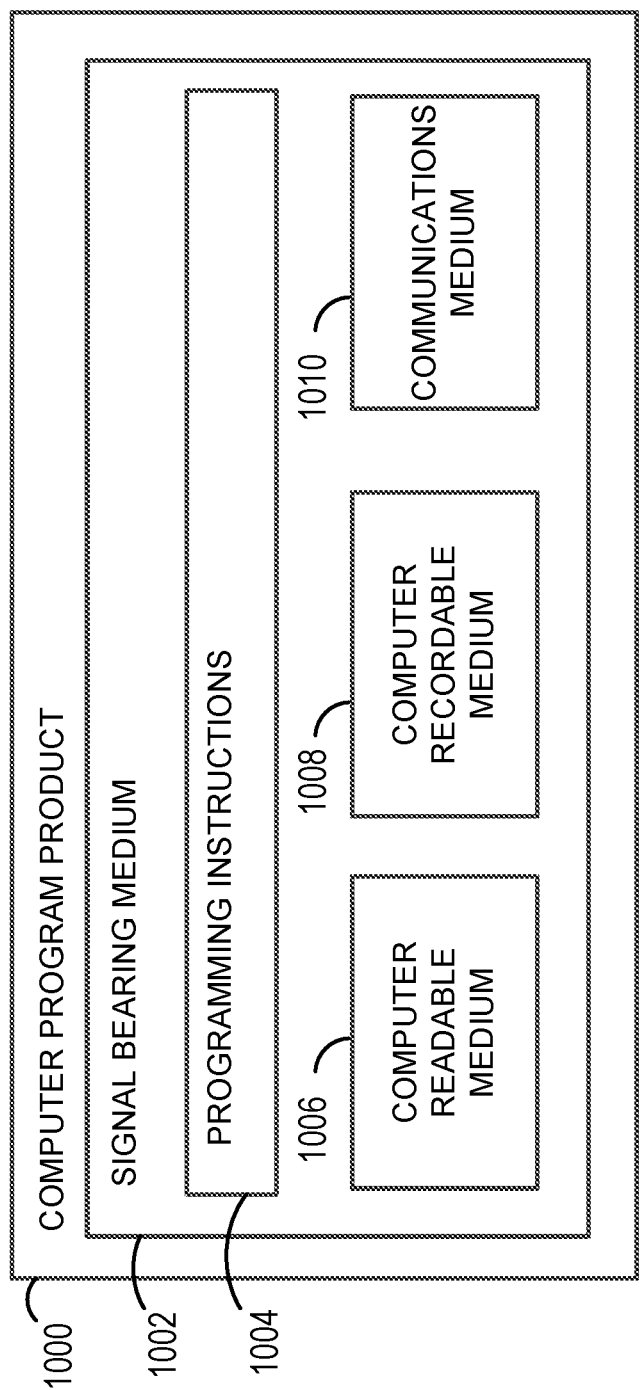
FIG. 10 is a schematic diagram of a computer program, according to example implementations.

FIG. 10 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 10, computer program product 1000 is provided using signal bearing medium 1002, which may include one or more programming instructions 1004 that, when executed by one or more processors may provide functionality or portions of the functionality described above with respect to FIGS. 1-7C.

Signal bearing medium 1002 may encompass a non-transitory computer-readable medium 1006, such as, but not limited to, a hard disk drive, a Compact Disc (CD), a Digital Video Disk (DVD), a digital tape, memory, components to store remotely (e.g., on the cloud) etc. In some implementations, signal bearing medium 1002 may encompass computer recordable medium 1008, such as, but not limited to, memory, read/write (R/W) CDs, R/W DVDs, etc.

In some implementations, signal bearing medium 1002 may encompass communications medium 1010, such as, but not limited to, a digital and/or an analog communication medium (e.g., a fiber optic cable, a waveguide, a wired communications link, a wireless communication link, etc.). Similarly, signal bearing medium 1002 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 1002 may be conveyed by a wireless form of communications medium 1010.

One or more programming instructions 1004 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 1004 conveyed to the computer system by one or more of computer readable medium 1006, computer recordable medium 1008, and/or communications medium 1010. The non-transitory computer readable medium could also be distributed among multiple data storage elements and/or cloud (e.g., remotely), which could be remotely located from each other. Computing device that executes some or all of the stored instructions could be a vehicle.

Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   setting, by a computing device based on a request from a client device, an initial pickup location;
   causing, by the computing device, an autonomous vehicle to navigate towards the initial pickup location;
   while the autonomous vehicle is on a route to the initial pickup location, generating, by the computing device, a plurality of candidate updated pickup locations for one or more failure scenarios, wherein the one or more failure scenarios include at least one of a scenario in which the autonomous vehicle misses a turn on the route, a scenario in which the autonomous vehicle is unable to pull over at the initial pickup location, or a scenario in which the autonomous vehicle stops at the initial pickup location but is then prompted to move away before pickup, and wherein the computing device generates the plurality of candidate updated pickup locations for the one or more failure scenarios prior to occurrence of any of the failure scenarios;
   selecting, by the computing device, a suggested pickup location from the plurality of candidate updated pickup locations that achieves a benchmark for reducing one or more of a time and a distance associated with the initial pickup location for one or more of the autonomous vehicle and the client device; and
   causing, by the computing device, the autonomous vehicle to navigate to the suggested pickup location.

2. The method of claim 1, wherein generating the plurality of candidate updated pickup locations comprises:
   using the one or more failure scenarios to determine candidate updates to the route to the initial pickup location; and
   generating the candidate updated pickup locations based on the candidate updates to the route.

3. The method of claim 1, further comprising:
   ranking the plurality of candidate updated pickup locations;
   sending the ranked plurality of candidate updated pickup locations to the autonomous vehicle; and
   authorizing the autonomous vehicle to select an updated pickup location from the ranked plurality of candidate updated pickup locations based on a local context of the autonomous vehicle,
   wherein the autonomous vehicle selects the updated pickup location from the ranked plurality of candidate updated pickup locations.

4. The method of claim 3, wherein each of the ranked plurality of candidate updated pickup locations corresponds to a different failure scenario of the one or more failure scenarios, and wherein the autonomous vehicle is configured to select one of the ranked plurality of candidate updated pickup locations based on a particular failure scenario detected by the autonomous vehicle.

5. The method of claim 1, wherein selecting the suggested pickup location from the plurality of candidate updated pickup locations comprises:
 ranking the plurality of candidate updated pickup locations; and
 selecting a highest-ranked candidate updated pickup location as the suggested pickup location.

6. The method of claim 5, wherein ranking the plurality of candidate updated pickup locations comprises:
 ranking each candidate updated pickup location based on (i) an estimated time of arrival associated with the candidate updated pickup location, and (ii) a walking cost associated with the candidate updated pickup location, wherein the walking cost corresponds to a walking distance between a location of the client device and the candidate updated pickup location.

7. The method of claim 6, wherein ranking each candidate updated pickup location based on the estimated time of arrival and the walking cost comprises using a cost function to score each candidate updated pickup location based on the estimated time of arrival and the walking cost.

8. The method of claim 1, wherein the autonomous vehicle is a first autonomous vehicle, the method further comprising:
 selecting, by the computing device, a second autonomous vehicle to navigate to the updated pickup location based on an estimated time of arrival of the second autonomous vehicle to the updated pickup location; and
 reassigning the first autonomous vehicle to another initial pickup location.

9. The method of claim 1, further comprising:
 determining that the suggested pickup location satisfies a set of pre-update checks for limiting a number of pickup location updates while the autonomous vehicle navigates towards the initial pickup location, wherein the set of pre-update checks for limiting the number of pickup location updates while the autonomous vehicle navigates towards the initial pickup location comprises one or more of:
 determining that the suggested pickup location provides a threshold level of improvement over the initial pickup location, wherein the threshold level of improvement corresponds to one or more of an estimated time to arrival associated with the suggested pickup location and a walking score associated with the suggested pickup location;
 determining that updating the initial pickup location corresponds to a number of pickup location updates that is less than a threshold number of pickup location updates;
 determining that updating the initial pickup location corresponds to a rate of pickup location updates that is less than a threshold rate of pickup location updates;
 determining that a threshold time has passed since selecting the suggested pickup location; and
 determining that the suggested pickup location is within a threshold radius of the initial pickup location.

10. The method of claim 1, wherein setting the initial pickup location comprises:
 generating a plurality of candidate initial pickup locations based on a location of the client device and a location of the autonomous vehicle;
 for each candidate initial pickup location:
  determining an estimated time of arrival associated with the candidate initial pickup location; and
  determining a walking cost associated with the candidate initial pickup location, wherein the walking cost corresponds to a walking distance between a location of the client device and the candidate initial pickup location; and
 selecting the initial pickup location from the plurality of candidate initial pickup locations based on a cost function of the estimated time of arrival and the walking cost for each candidate initial pickup location.

11. The method of claim 1, further comprising:
 setting, by the computing device, an initial dropoff location;
 causing, by the computing device, the autonomous vehicle to navigate from the updated pickup location towards the initial dropoff location;
 while the autonomous vehicle navigates towards the initial dropoff location, generating, by the computing device, a plurality of candidate updated dropoff locations;
 selecting, by the computing device, a suggested dropoff location from the plurality of candidate dropoff locations that achieves a benchmark for reducing one or more of a time and a distance associated with the initial dropoff location for the autonomous vehicle; and
 causing, the autonomous vehicle to navigate to the suggested dropoff location.

12. The method of claim 11, further comprising:
 determining that the suggested dropoff location satisfies a set of pre-update checks for limiting a number of dropoff location updates while the autonomous vehicle navigates towards the initial dropoff location, wherein the set of pre-update checks for limiting the number of dropoff location updates while the autonomous vehicle navigates towards the initial dropoff location comprises one or more of:
 determining that the suggested dropoff location provides a threshold level of improvement over the initial dropoff location, wherein the threshold level of improvement corresponds to one or more of an estimated time to arrival associated with the suggested dropoff location and a walking score associated with the dropoff pickup location;
 determining that updating the initial pickup location corresponds to a number of pickup location and dropoff location updates that is less than a threshold number of pickup location and dropoff location updates;
 determining that updating the initial dropoff location corresponds to a rate of dropoff location updates that is less than a threshold rate of dropoff location updates;
 determining that a threshold time has passed since selecting the suggested dropoff location; and
 determining that the suggested dropoff location is within a threshold radius of the initial dropoff location.

13. A system comprising:
 a computing device comprising:
  one or more processors; and
  a non-transitory computer readable medium having instructions stored thereon, that when executed by the one or more processors cause the computing device to perform a set of functions comprising:
   setting, based on a request from a client device, an initial pickup location;
   causing an autonomous vehicle to navigate towards the initial pickup location;
   while the autonomous vehicle is on a route to the initial pickup location, generating a plurality of candidate updated pickup locations for one or more failure scenarios, wherein the one or more failure scenarios include at least one of a scenario in which the autonomous vehicle misses a turn on the route, a scenario in which the autonomous vehicle is unable to pull over at the initial pickup location, or a scenario in which the autonomous vehicle stops at the initial pickup location but is then prompted to move away before pickup, and wherein the plurality of candidate updated pickup locations for the one or more failure scenarios are generated prior to occurrence of any of the failure scenarios;

selecting a suggested pickup location from the plurality of candidate updated pickup locations that achieves a benchmark for reducing one or more of a time and a distance associated with the initial pickup location for one or more of the autonomous vehicle and the client device;

causing the autonomous vehicle to navigate to the suggested pickup location.

14. The system of claim 13, wherein generating the plurality of candidate updated pickup locations comprises:

using the one or more failure scenarios to determine candidate updates to the route to the initial pickup location; and generating the candidate updated pickup locations based on the candidate updates to the route.

15. The system of claim 13, wherein the set of functions further comprises:

ranking the plurality of candidate updated pickup locations;

sending the ranked plurality of candidate updated pickup locations to the autonomous vehicle; and wherein the autonomous vehicle selects an updated pickup location from the ranked plurality of candidate updated pickup locations based on a local context of the autonomous vehicle.

16. The system of claim 15, wherein each of the ranked plurality of candidate updated pickup locations corresponds to a different failure scenario of the one or more failure scenarios, and wherein the autonomous vehicle is configured to select one of the ranked plurality of candidate updated pickup locations based on a particular failure scenario detected by the autonomous vehicle.

17. The system of claim 13, the set of functions further comprising:

setting, by the computing device, an initial dropoff location;

causing, by the computing device, the autonomous vehicle to navigate from the updated pickup location towards the initial dropoff location;

while the autonomous vehicle navigates towards the initial dropoff location, generating, by the computing device, a plurality of candidate updated dropoff locations;

selecting, by the computing device, a suggested dropoff location from the plurality of candidate dropoff locations that achieves a benchmark for reducing one or more of a time and a distance associated with the initial dropoff location for the autonomous vehicle;

determining that the suggested dropoff location satisfies a set of pre-update checks for limiting a number of dropoff location updates while the autonomous vehicle navigates towards the initial drop off location; and responsive to (i) selecting the suggested dropoff location that achieves the benchmark, and (ii) determining that the suggested dropoff location satisfies the set of pre-update checks, creating an updated dropoff location matching the suggested dropoff location; and causing, by the computing device, the autonomous vehicle to navigate to the updated drop off location.

18. A non-transitory computer-readable medium having instructions stored thereon, that when executed by one or more processors cause a computing device to perform a set of functions comprising:

setting, based on a request from a client device, an initial pickup location;

causing an autonomous vehicle to navigate towards the initial pickup location;

while the autonomous vehicle is on a route to the initial pickup location, generating a plurality of candidate updated pickup locations for one or more failure scenarios, wherein the one or more failure scenarios include at least one of a scenario in which the autonomous vehicle misses a turn on the route, a scenario in which the autonomous vehicle is unable to pull over at the initial pickup location, or a scenario in which the autonomous vehicle stops at the initial pickup location but is then prompted to move away before pickup, and wherein the plurality of candidate updated pickup locations for the one or more failure scenarios are generated prior to occurrence of any of the failure scenarios;

selecting a suggested pickup location from the plurality of candidate updated pickup locations that achieves a benchmark for reducing one or more of a time and a distance associated with the initial pickup location for one or more of the autonomous vehicle and the client device;

causing the autonomous vehicle to navigate to the suggested pickup location.

19. The non-transitory computer-readable medium of claim 18, wherein the set of functions further comprises:

determining that the suggested pickup location satisfies a set of pre-update checks for limiting a number of pickup location updates while the autonomous vehicle navigates towards the initial pickup location, wherein the set of pre-update checks for limiting the number of pickup location updates while the autonomous vehicle navigates towards the initial pickup location comprises one or more of:

determining that the suggested pickup location provides a threshold level of improvement over the initial pickup location, wherein the threshold level of improvement corresponds to one or more of an estimated time to arrival associated with the suggested pickup location and a walking score associated with the suggested pickup location;

determining that updating the initial pickup location corresponds to a number of pickup location updates that is less than a threshold number of pickup location updates;

determining that updating the initial pickup location corresponds to a rate of pickup location updates that is less than a threshold rate of pickup location updates;

determining that a threshold time has passed since selecting the suggested pickup location; and determining that the suggested pickup location is within a threshold radius of the initial pickup location.

* * * * *